United States Patent
Hong et al.

(10) Patent No.: US 11,141,712 B2
(45) Date of Patent: Oct. 12, 2021

(54) CATALYST FOR PRODUCING OLEFIN HAVING ENHANCED STABILITY, CONVERSION RATE AND SELECTIVITY, AND PREPARATION METHOD THEREOF

(71) Applicants: SK GAS CO., LTD., Seongnam-si (KR); KOREA RESEARCH INSTITUTE OF CHEMICAL TECHNOLOGY, Daejeon (KR)

(72) Inventors: Ung Gi Hong, Seoul (KR); Deuk Soo Park, Goyang-si (KR); Won Choon Choi, Daejeon (KR)

(73) Assignees: SK GAS CO., LTD., Gyeonggi-do (KR); KOREA RESEARCH INSTITUTE OF CHEMICAL TECHNOLOGY, Daejeon (KR)

(*) Notice: Subject to any disclaimer, the term of this patent is extended or adjusted under 35 U.S.C. 154(b) by 94 days.

(21) Appl. No.: 16/468,556

(22) PCT Filed: May 1, 2018

(86) PCT No.: PCT/KR2018/005048
§ 371 (c)(1),
(2) Date: Jun. 11, 2019

(87) PCT Pub. No.: WO2018/225953
PCT Pub. Date: Dec. 13, 2018

(65) Prior Publication Data
US 2020/0086300 A1 Mar. 19, 2020

(30) Foreign Application Priority Data
Jun. 7, 2017 (KR) .......................... 10-2017-0070870

(51) Int. Cl.
*B01J 23/26* (2006.01)
*B01J 21/06* (2006.01)
(Continued)

(52) U.S. Cl.
CPC ............. *B01J 23/26* (2013.01); *B01J 21/066* (2013.01); *B01J 35/1014* (2013.01);
(Continued)

(58) Field of Classification Search
CPC ...... B01J 23/26; B01J 21/066; B01J 35/1014; B01J 35/1019; B01J 37/0205; B01J 37/08
See application file for complete search history.

(56) References Cited

U.S. PATENT DOCUMENTS

| | | | | |
|---|---|---|---|---|
| 5,378,350 A | * | 1/1995 | Zimmermann | .......... B01J 23/26 208/136 |
| 8,680,357 B1 | * | 3/2014 | Rokicki | ................ C07C 5/3332 585/663 |
| 2003/0065235 A1 | * | 4/2003 | Allison | ..................... C07C 5/48 585/656 |

FOREIGN PATENT DOCUMENTS

CN 105727930 A * 7/2016
JP 2011-527941 A 11/2011
(Continued)

OTHER PUBLICATIONS

Rombi et al ("Effects of potassium addition on acidity and reducibility of chromia/alumina dehydrogenation catalysts," Appl Cata A: Gen 251 (2003) 255-266). (Year: 2003).*
(Continued)

*Primary Examiner* — Sheng H Davis
*Assistant Examiner* — Michael Forrest
(74) *Attorney, Agent, or Firm* — Paratus Law Group, PLLC

(57) ABSTRACT

Disclosed are a catalyst for producing olefin and a preparation method thereof. The catalyst for producing olefin includes: a support including an alumina and a sub-support component; and a catalytic component comprising a metal component and an alkali metal impregnated on the support. The preparation method includes: providing a support com-
(Continued)

prising a sub-support component and an alumina; preparing pre-catalyst by dipping a metal component oxide in the support and calcining it; and dipping a metal component oxide and an alkali metal oxide in the pre-catalyst and calcining it.

10 Claims, 3 Drawing Sheets

(51) Int. Cl.
    *B01J 35/10*     (2006.01)
    *B01J 37/02*     (2006.01)
    *B01J 37/08*     (2006.01)

(52) U.S. Cl.
    CPC ....... *B01J 35/1019* (2013.01); *B01J 37/0205* (2013.01); *B01J 37/08* (2013.01)

(56) References Cited

FOREIGN PATENT DOCUMENTS

| | | |
|---|---|---|
| KR | 10-2002-0040789 A | 5/2002 |
| KR | 10-2003-0072241 A | 9/2003 |
| KR | 10-1471207 B1 | 12/2014 |
| KR | 10-2017-0052461 A | 5/2017 |

OTHER PUBLICATIONS

International Search Report for PCT/KR2018/005048 dated Oct. 15, 2018 from Korean Intellectual Property Office.

\* cited by examiner

CATALYST FOR PRODUCING OLEFIN HAVING ENHANCED STABILITY, CONVERSION RATE AND SELECTIVITY, AND PREPARATION METHOD THEREOF

CROSS-REFERENCE TO PRIOR APPLICATIONS

This application is a National Stage Patent Application of PCT International Patent Application No. PCT/KR2018/005048 (filed on May 1, 2018) under 35 U.S.C. § 371, which claims priority to Korean Patent Application No. 10-2017-0070870 (filed on Jun. 7, 2017), which are all hereby incorporated by reference in their entirety.

BACKGROUND

The present invention relates to a catalyst for producing olefin having enhanced stability, conversion rate and selectivity, and a preparation method thereof.

The olefin like ethylene and propylene is widely used in the petrochemical industry. The olefin can be generally produced from naphtha thermal cracking process. However, because the olefin requirement of the petrochemical industry is increasing more and more, there is a try to produce the olefin from low-grade hydrocarbon by the catalytic dehydrogenation process.

For example, propylene is a basic material used as an index of the petrochemical industry like ethylene. It can be converted to various chemical compound because it has both methyl group and allyl group. Representatively, it is mainly used for producing polypropylene of the thermoplastic plastic, and otherwise used as raw material for acrylonitrile, propylene oxide, epoxy resin, oxo alcohol, isopropyl alcohol and so on.

Until now, propylene is mainly produced as the byproduct of crude oil cracking process or produced together with ethylene by steam cracking of naphtha obtained from crude oil distillation. However, because the present technology of ethylene production is focused on an economic gas decomposition process so that the enlargement of the traditional naphtha cracking process becomes more difficult, propylene supply is limited. And recently, the global demand, especially in China and India, of propylene used for the vehicle and the electric material is rapidly increased so that the imbalance between supply and demand of propylene is expected to become severe.

Therefore, on-purpose supply technology becomes to be a big issue for solving the above problem. Especially, the research on C4~C8 olefin conversion process, olefin metathesis process, methanol-to-propylene process, propane dehydrogenation process and so on, is being conducted briskly. In the above processes, propane dehydrogenation process receives recent attention mostly because of the price merit of propylene to propane and the increment demand of development of eco-friendly energy production technology. Propane cost is reduced due to the vigorous development of shale gas and tight oil mainly in North America so that the economic efficiency of it is expected to be enhanced.

Presently used propane dehydrogenation technologies are based on a noble metal catalyst and a discontinuous process. Despite of a continuous process, it is known to be inappropriate to massive production of several millions of tons of propylene because there is a problem in the operation of the catalyst bed. Moreover, propane dehydrogenation reaction has a thermodynamically limited conversion rate due to the reversible reaction caused by hydrogen. In order to overcome this problem, many processes use the external oxidant such as oxygen, halogen, sulfur compound, carbon dioxide, steam, etc. in order to convert hydrogen to water. Therefore, the development of a new propane dehydrogenation process with the production cost reduced by solving the problem of the continuous process and using cheap non-noble metal catalyst is demanded for effective mass production of propylene.

In case of noble metal catalyst among the catalysts used for propane dehydrogenation, the reaction proceeds according to the direct dehydrogenation mechanism wherein hydrogen is adsorbed to the active site. However, in case of transition metal oxide, the mechanism cannot be verified clearly because of the instability of the active site caused by the electron mobility.

In the transition metal catalyst, the catalyst that the chromium oxide or vanadium oxide is impregnated on alumina as an active phase is used. There is a try to impregnate small amount of alkali metal simultaneously in some catalysts in order to inhibit byproduct generation caused by the acid site of the alumina support. However, sufficient yield of propylene cannot be obtained only by the above metal due to the side reaction so that the research on more efficient catalyst is needed realistically.

Accordingly, the present inventors solved the problem revealed in the prior art (Korean patent number 0651418 and Korean patent publication number 2017-0007636) by continuous research, and developed the catalyst for producing olefin having excellent stability, conversion rate and selectivity simultaneously and the preparation method thereof.

SUMMARY

The purpose of the present invention is to provide a catalyst for producing olefin having enhanced stability, conversion rate and selectivity, and a preparation method thereof.

The purpose of the present invention is to provide the catalyst for producing olefin, which comprises a support including an alumina and a sub-support component; and a catalytic component comprising a metal component and an alkali metal impregnated on the support.

The sub-support component comprises anyone selected from zirconium, zinc and platinum. The sub-support component is preferably zirconium, which exists in the mole fraction of 0.01 to 0.1 relative to aluminum of the alumina (Zr:Al).

The metal component comprises anyone selected from an oxide of chromium, vanadium, manganese, iron, cobalt, molybdenum, copper, zinc, cerium and nickel. The metal component is preferably chromium, which is 10 to 20 wt % of the catalyst.

The alkali metal is preferably potassium, which is 0.5 to 2.0 wt % of the catalyst.

Also, it is preferable that the surface area of the catalyst is 80~300 $m^2/g$ and the acidity of alumina is not more than 0.5 µmol $NH_3/m^2$.

An another embodiment of the present invention is to provide the preparation method of the catalyst for producing olefin, which comprises providing a support comprising a sub-support component and an alumina; preparing the pre-catalyst by impregnating a metal component oxide on the support and calcining it; and impregnating a metal component oxide and an alkali metal oxide in the pre-catalyst and calcining it.

In case of the catalyst for producing olefin according to the present invention, the conversion rate and the selectivity are excellent and the stability relevant to the catalyst life span is also excellent so that the economic efficiency is excellent in view of the commercial aspect.

DETAILED DESCRIPTION

Figure 1:
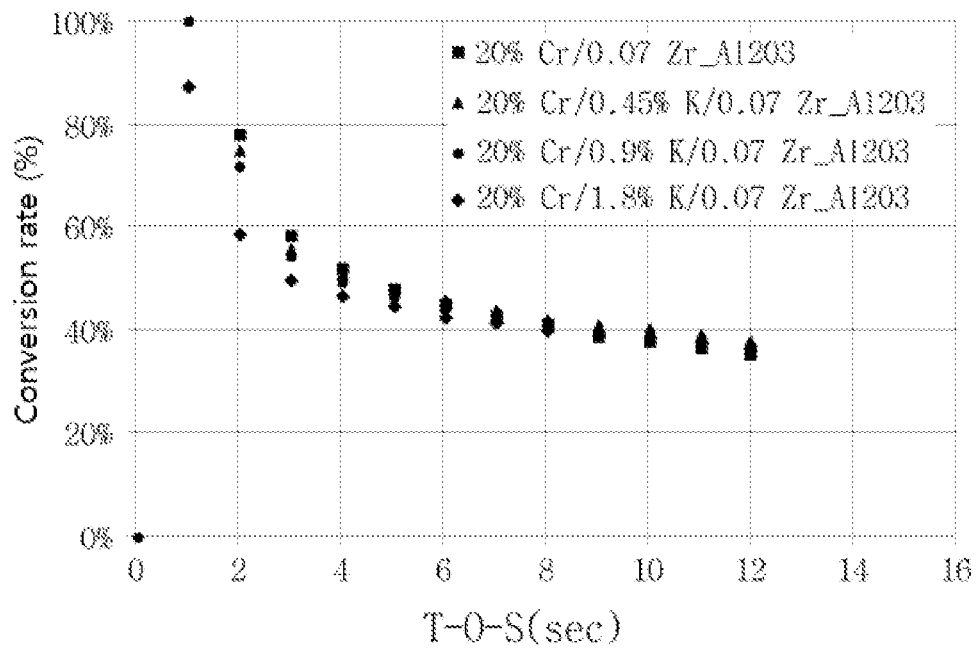
FIG. 1 is a graph describing the propane conversion rate of the catalyst according to Comparative example and the present invention.

The present invention is to provide the catalyst for producing olefin, which comprises a support including an alumina and a sub-support component; and a catalytic component comprising a metal component and an alkali metal impregnated on the support.

Hereinafter, preferable examples of the present invention will be described referring to the attached figures. It is to be understood, however, that these examples can be modified to various other type and are not to be construed to limit the scope of the present invention.

The catalyst according to the present invention comprises a support and a catalytic component.

The support comprises an alumina and a sub-support component, and the catalytic component impregnated on the support is a metal component and an alkali metal.

The sub-support component comprises anyone or combination selected from zirconium, zinc and platinum. The sub-support component is preferably zirconium, which exists in the mole fraction of 0.01 to 0.1 relative to aluminum of the alumina (Zr:Al).

The durability of the catalyst according to the present invention is enhanced by the sub-support component. The function to excite C—H bond of paraffin feedstock is more excellent than using only the alumina as a support. In result, hydrocarbon conversion rate and olefin yield are excellent, and olefin selectivity is enhanced. Especially, zirconium plays roles in enhancing the durability of the alumina support.

When the amount of the sub-support component, especially zirconium, is less than 0.01 of mole ratio relative to aluminium, the characteristic effect of the durability enhancement is not accomplished. When more than 0.1, the impregnated metal component and alkali metal cannot be polydispersed because of the rapid decrease of the surface area of the alumina support.

The metal component comprises anyone selected from an oxide of chromium, vanadium, manganese, iron, cobalt, molybdenum, copper, zinc, cerium and nickel. The metal component is preferably chromium, which is 10 to 20 wt % of the catalyst.

When the amount of the metal component, especially chromium, is less than 10 wt %, the rapid inactivation is incurred because the active site of the main catalyst is too small in chromium phase. When more than 20 wt %, main active phase in chromium can be reduced due to metal-support interaction and excessive metallic binding force. Therefore the optimal loading amount within the above range is required.

The alkali metal is preferably potassium, which is preferably comprised at 0.5 to 2.0 wt % of the catalyst so that the acidity of the alumina is controlled to be not more than 0.5 $\mu mol\ NH_3/m^2$.

When the amount of the alkali metal, especially potassium, is less than 0.5 wt %, because the acid site of the alumina support cannot be controlled, the side reaction of the acid decomposition reaction is incurred so that excessive coke is generated, and the active phase of chromium cannot be controlled so that the yield becomes to be decreased. And when more than 2 wt %, the subcomponent potassium reduces the porosity of the alumina so that the mass transfer for the catalytic activation during the contact with the reactant is hindered.

The alumina support preferably has γ~θ phase at the preparation temperature of 550~850° C. higher than the dehydrogenation temperature, and has the surface area of 80~300 m²/g within this range.

When the support is prepared at the temperature less than the reaction temperature of the dehydrogenation, the thermal deformation of the catalyst can be incurred during the dehydrogenation reaction. When it is prepared at the temperature over 850° C., the surface area of the catalyst is small due to the crystallization of the support so that the mass transfer for the catalytic activation during the contact with the reactant is hindered.

An another embodiment of the present invention is to provide the preparation method of the catalyst for producing olefin, which comprises providing a support comprising a sub-support component and an alumina; preparing the pre-catalyst by impregnating a metal component oxide on the support and calcining it; and dipping a metal component oxide and an alkali metal oxide in the pre-catalyst and calcining it.

Despite of the above preparation method, it is obvious to a skilled person that various modifications and changes can be made within the scope of the present invention.

Hereinafter, the present invention will be described in more detail using Examples and Preparation examples.

<Preparation Example>

1. Support (Zr—Al2O3) Preparation

Catapal B (alumina sold by Sasol) 13.89 kg added with water 25 kg is agitated for 30 minutes, and 1.83 kg of $ZrO(NO_3)_2$ and 25 kg of water is mixed and further agitated for 2.5 hours. Then, it is spray dried (feed velocity 0.56 g/min, atomizer 6000 rpm, inlet temperature 208° C., outlet temperature 125° C.), sieving separated (sieving: 75~200 μm), and calcined at 650° C. for 6 hours.

2. Catalyst [(5% Cr+0.5% K)/5% Cr/Zr—Al₂O₃] Preparation 0.482 g of $CrO_3$ and 2.5 g of water is mixed and impregnated with 5 g of the support as prepared above, dried at 120° C., and calcined at 700° C. for 3 hours (pre-catalyst).

0.482 g of $CrO_3$, 0.068 g of $KNO_3$ and 2.5 g of water is mixed and impregnated with 5.25 g of 5% Cr/Zr—Al₂O₃ as prepared above, dried at 120° C., and calcined at 700° C. for 3 hours so that the catalyst of the present invention is prepared.

<Experiment for Conversion Rate and Selectivity>

In order to confirm the conversion rate and the selectivity of the catalyst prepared according to the present invention, GC (FID, TCD) analysis is conducted at a fixed bed Quarts downflow reactor charged with the catalyst and maintained at the space velocity of 8400 ml/$g_{cat}$.hr under 600° C. and atmospheric pressure. The experimental result is described in FIG. 1 to FIG. 3.

Figure 2:
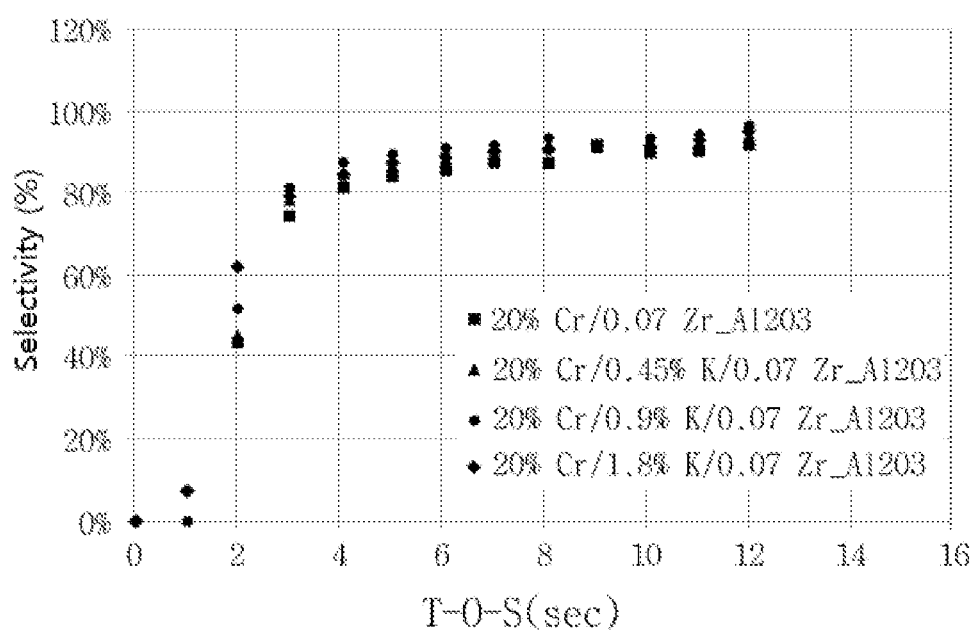
FIG. 2 is a graph describing the propylene selectivity of the catalyst according to Comparative example and the present invention.
Figure 3:
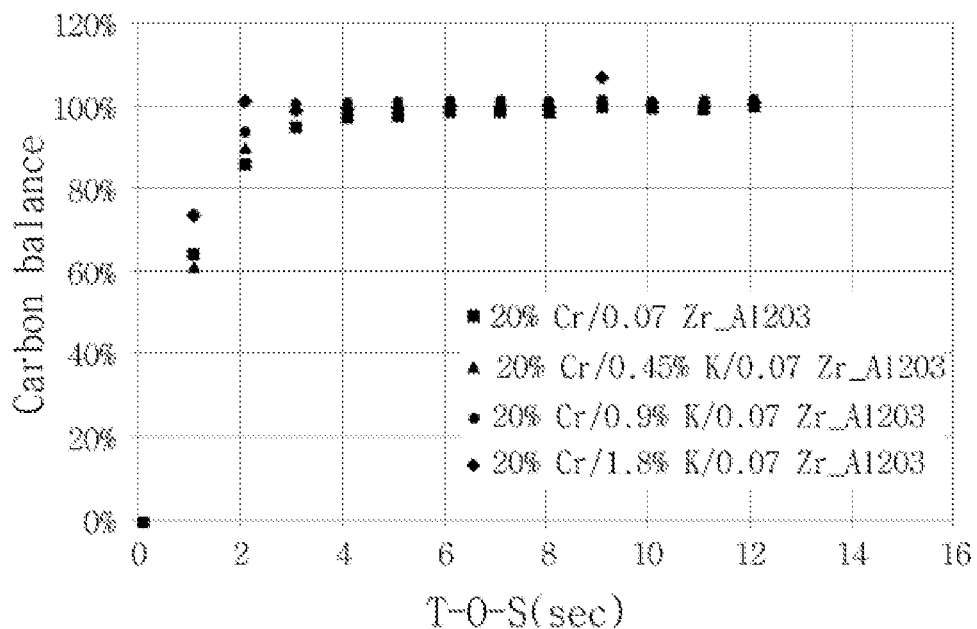
FIG. 3 is a graph describing Carbon Balance of the catalyst according to Comparative example and the present invention.

As shown in FIG. 1 and FIG. 2, when the catalyst of the present invention is impregnated with the metal component and the alkali metal (potassium:K) at the same time, the conversion rate and the selectivity are verified to be excellent. Furthermore, as shown in FIG. 3, the coke generation caused by the side reaction is small in the catalyst of the present invention (Carbon Balance).

<Stability Experiment>

Figure 4:
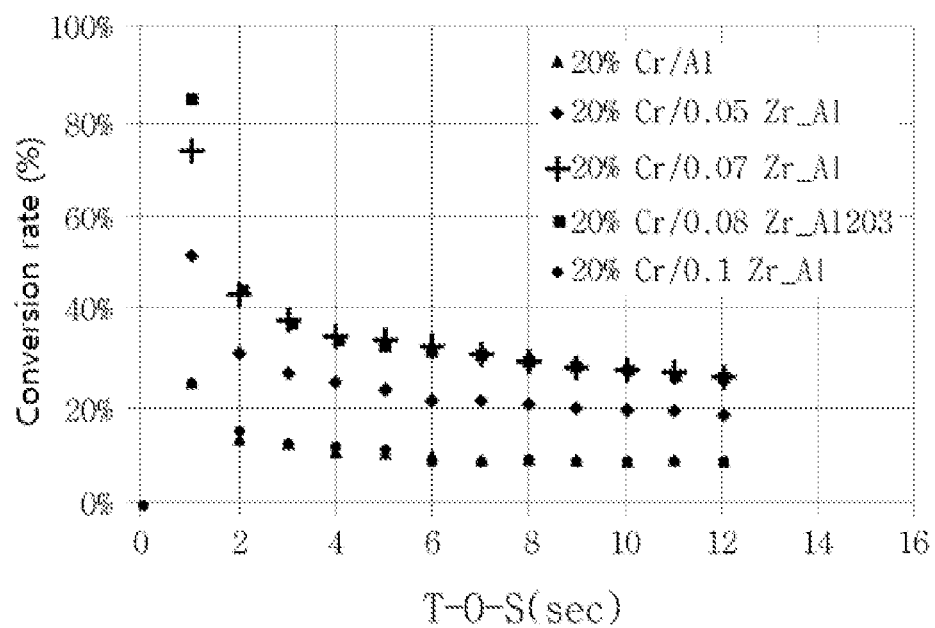
FIG. 4 is a graph describing the conversion rate after the hydrothermal treatment according to Comparative example and the case of the support impregnated with zirconium simultaneously.
Figure 5:
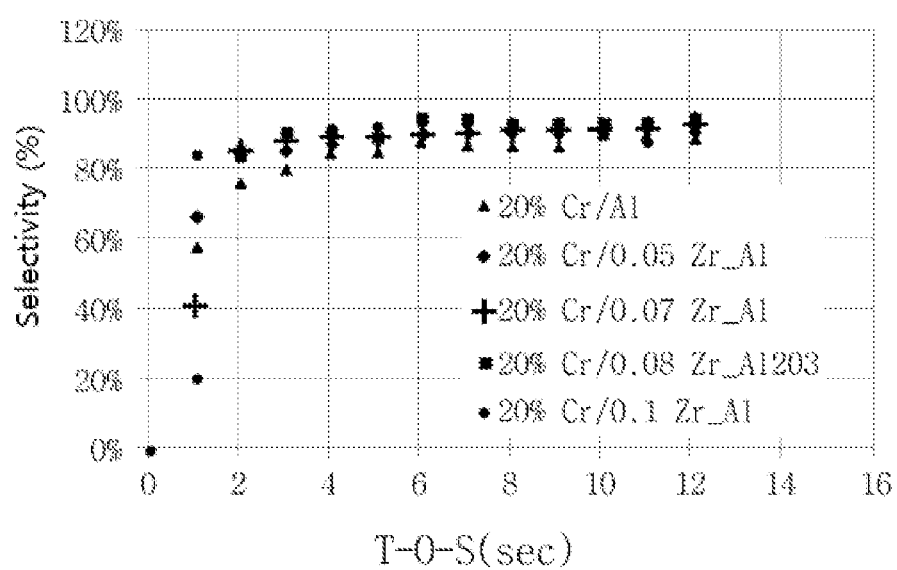
FIG. 5 is a graph describing the selectivity after the hydrothermal treatment according to Comparative example and the case of the support impregnated with zirconium simultaneously.

In order to verify the hydrothermal stability of the catalyst prepared according to the present invention, in the case that the sub-support component (zirconium:Zr) is added to the alumina support of the catalyst according to the present invention and the other case that the sub-support component is not added to the catalyst (Comparative example), the conversion rate and the selectivity are measured in the same manner as the above after the catalyst is forced to be treated with 800° C. and 100% steam for 24 hours (FIG. 4 and FIG. 5).

As shown in FIG. 4 and FIG. 5, in the case that sub-support component (zirconium:Zr) is added to the alumina support of the catalyst according to the present invention, the hydrothermal stability is verified to be excellent. In the above, preferable examples of the present invention is described in detail. However, it is obvious to a skilled person that the claimed scope of the present invention is not limited to these examples, and various modifications and changes can be made within the scope of the present invention.

The present invention relates to the catalyst having enhanced stability, conversion rate and selectivity for producing olefin, and a preparation method thereof.

The invention claimed is:

1. A catalyst for producing olefin comprising:
    a support including an alumina and a sub-support component; and a catalytic component consisting of a metal component and an alkali metal impregnated on the support,
    wherein the metal component is an oxide of a metal selected from the group consisting of chromium, vanadium, manganese, iron, cobalt, molybdenum, copper, zinc, cerium, nickel, and mixtures thereof,
    wherein the surface area of the catalyst is 80-300 $m^2$/g, and the acidity of the alumina is not more than 0.5 μmol $NH_3$/$m^2$.

2. The catalyst of claim 1, wherein the sub-support component is selected from zirconium, zinc and platinum.

3. The catalyst of claim 2, wherein the sub-support component is zirconium, which exists in the mole fraction of 0.01 to 0.1 relative to aluminum of the alumina (Zr:Al).

4. The catalyst of claim 1, wherein the metal component is chromium, which is 10 to 20 wt % of the catalyst.

5. The catalyst of claim 1, wherein the alkali metal is potassium, which is 0.5 to 2.0 wt % of the catalyst.

6. A preparation method of the catalyst of claim 1 comprising:
    providing the support comprising the sub-support component and the alumina;
    preparing pre-catalyst by dipping an oxide of the metal component in the support and calcining it; and
    dipping an oxide of the metal component and an oxide of the alkali metal in the pre-catalyst and calcining it wherein the catalyst made is the catalyst of claim 1.

7. The method of claim 6, wherein the sub-support component is selected from zirconium, zinc and platinum.

8. The method of claim 7, wherein the sub-support component is zirconium, which exists in the mole fraction of 0.01 to 0.1 relative to aluminum of the alumina (Zr:Al).

9. The method of claim 6, wherein the metal component is chromium, which is 10 to 20 wt % of the catalyst.

10. The method of claim 6, wherein the alkali metal is potassium, which is 0.5 to 2.0 wt % of the catalyst.

* * * * *